United States Patent [19]
Wall et al.

[11] Patent Number: 5,066,162
[45] Date of Patent: Nov. 19, 1991

[54] ATTACHMENT DEVICE

[75] Inventors: Alan Wall, Stockport; Peter Grayson, Manchester; Michael Egerton, Rochdale, all of United Kingdom

[73] Assignee: Harold Watson Limited, Lancs, United Kingdom

[21] Appl. No.: 481,370

[22] Filed: Feb. 15, 1990

[30] Foreign Application Priority Data

Feb. 15, 1989 [GB] United Kingdom ............. 8903455

[51] Int. Cl.⁵ .................................................. B25G 3/02
[52] U.S. Cl. ................................... 403/361; 15/147 R; 279/102
[58] Field of Search ............... 15/142 R, 228, 229.2, 15/229.8; 403/361; 279/102, 1 Q

[56] References Cited

U.S. PATENT DOCUMENTS

| | | |
|---|---|---|
| 1,182,844 | 5/1916 | Harr . |
| 2,665,441 | 1/1954 | Goon . |
| 2,796,622 | 6/1957 | Kalinowski . |
| 2,943,892 | 7/1960 | Hessler et al. ............... 15/229.8 X |
| 3,187,363 | 6/1965 | Auwarter ..................... 15/229.2 |
| 4,135,272 | 1/1979 | Stephenson ................... 15/147 R |
| 4,553,282 | 11/1985 | Batchelor ..................... 15/229.2 X |

FOREIGN PATENT DOCUMENTS

| | | |
|---|---|---|
| 1030505 | 6/1953 | France . |
| 626918 | 7/1949 | United Kingdom . |
| 730596 | 5/1955 | United Kingdom . |
| 1161336 | 8/1969 | United Kingdom . |

Primary Examiner—Andrew V. Kundrat
Attorney, Agent, or Firm—Skjerven, Morrill, MacPherson, Franklin & Friel

[57] ABSTRACT

An attachment device (10) for connecting a mop head to a pole comprising a collar (11) and a boss (12) extending upwardly from the collar. A plurality of slots (14) extend vertically through the boss wall, the slots (14) being bridged by bridging nuts (15). This arrangement allows the diameter of the channel (13) defined by the boss (12) to be resiliently increased in order to accomodate poles of differing diameters within the channel (13).

8 Claims, 4 Drawing Sheets

ATTACHMENT DEVICE

This invention relates to an attachment device, particularly but not exclusively to a device for attaching a mop head to a pole.

Many devices of this kind have previously been manufactured from metals such as steel. These devices comprise a collar which is secured to a boss by passing a plurality of clips which project from the base of the boss through corresponding apertures provided in the collar and subsequently deforming these projections. The mop head is stapled to the collar. The attachment device is secured to the pole by forcing a nail into the pole through a hole provided in the boss.

Other devices of this kind are manufactured from plastics material. These types of device comprise a substantially parallelepiped collar which abuts the base of a hollow boss. A plurality of strengthening ribs may be provided on the exterior of the boss. These ribs taper from the collar, to which they are also secured, towards the top of the boss. The purpose of these ribs is to provide strength and thereby prevent deformation of the boss. A number of tapered ribs of smaller dimensions are provided on the interior of the boss. These ribs increase in height further into the hollow boss. A pole of plastics material for use with this attachment means is provided with a thread which may be tapered at the end to be attached to the boss. In use, this end of the pole is inserted with rotation into the boss. The thread on the pole engages the ribs on the interior of the boss.

The mop head is attached to the attachment device by stapling.

This type of device can only successfully securely accomodate substantially one size of pole diameter.

The prior art has failed to provide an attachment means which can successfully securely accomodate poles of differing diameters.

According to the present invention there is provided an attachment device for poles comprising a collar, means for attaching a body to a first side of the collar, a boss defining a channel, at least part of the boss projecting from the side of the collar which is remote from the first side of the collar, means for securing at least part of a pole to the boss characterised in that means are provided for enabling the channel to expand, such that the boss is adapted to accomodate poles of differing diameters.

The boss is preferably circular in plan view. The means for enabling the channel to expand are preferably integral with the wall of the boss. In a preferred embodiment a plurality of slots are provided at intervals in the wall of the boss, these slots being bridged by bridging ribs, the walls of the bridging ribs preferably being of substantially smaller width than the width of the wall of the boss. The slots may be concentrically spaced to allow substantially uniform expansion of the channel defined by the boss.

The means of securing the pole to the boss may comprise a plurality of ribs located on the inner surface of the boss such that the ribs project into the channel. The ribs may project upwardly from substantially the base of the channel. These ribs preferably taper from the base of the ribs towards the upper section of the ribs. In an alternative embodiment the ribs extend transversely within the channel. The transversely extending ribs may be or appear substantially concentrically spaced in plan view and/or spaced at intervals when viewed in vertical cross section through the boss.

The collar may be attached to the boss at the base or top of the boss or it may be attached to the exterior of the wall of the boss.

The dimensions of the channel may be adapted to accommodate any range of pole size such as from 2.26 cm to 2.67 cm or from 1.8 cm to 2.15 cm.

The attachment device may be made of any suitable material such as plastics, for example polypropylene, by for example injection moulding.

The mop head may be attached to the collar by stapling.

In order that the invention may be more readily understood, a specific embodiment thereof will now be described by way of example with reference to the accompanying drawings, in which.

In the drawings, similar reference numerals are used to represent like parts.

Figure 1:
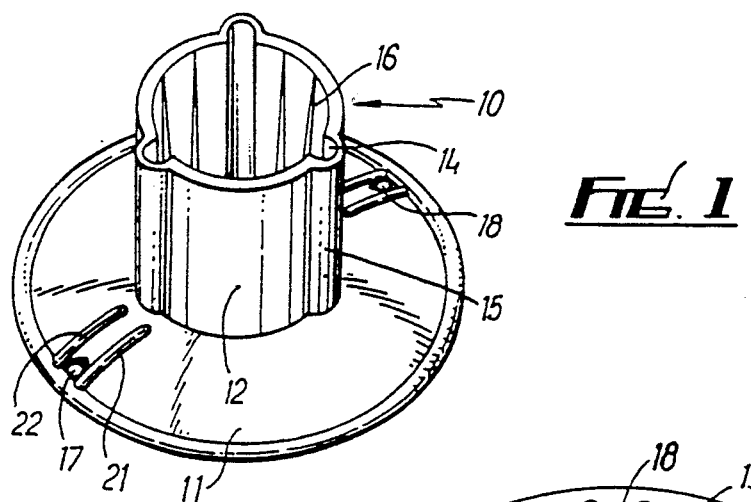
FIG. 1 is a perspective view of one embodiment of the invention.
Figure 2:
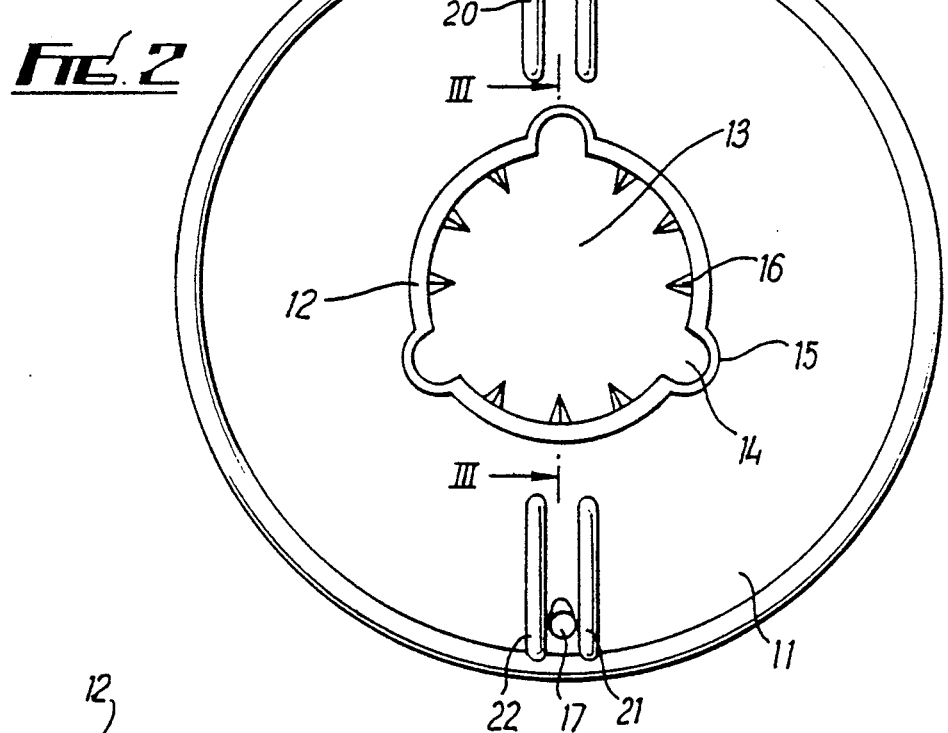
FIG. 2 is a plan view of FIG. 1.
Figure 3:
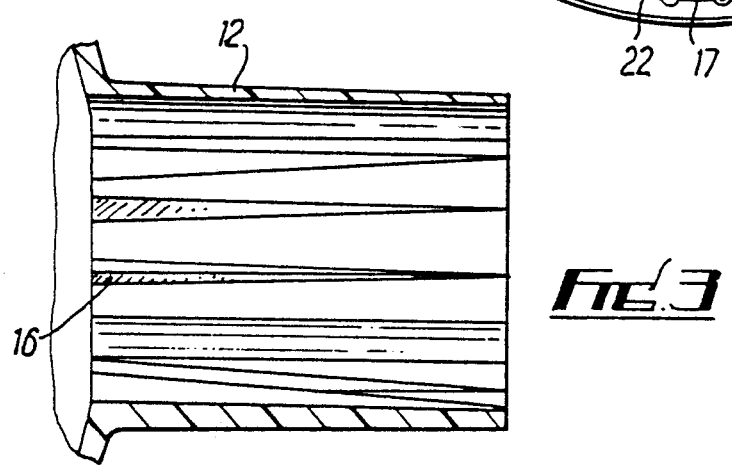
FIG. 3 is a cross section through the line III—III of FIG. 2.

Referring now to FIGS. 1 to 3, an attachment device 10 for poles (not shown) comprises a collar 11 which abuts the base of a boss 12. The boss 12 is substantially cylindrical and provides a channel therethrough. A plurality of slots 14 extend vertically through the wall of the boss 12 from the base of the boss 12 to the top of the boss 12. Three concentrically spaced slots 14 are shown. These slots 14 are bridged by bridging ribs 15. The width of the walls of the bridging ribs 15 is substantially smaller than the width of the wall of the boss 12 as can be clearly seen in FIG. 2. The base of each of the bridging ribs 15 is secured to the collar 11.

The arrangement of bridging ribs 15 and slots 14 allows the diameter of the channel 13 defined by the boss 12 to be resiliently increased when desired. The boss 12 can therefore securely accommodate a range of pole diameters in the channel 13.

It will be appreciated that the degree of expansion of the channel 13 is dependent on the width of the wall of the bridging rib, the dimensions of the bridging rib and the material of manufacture.

A plurality of double tapered ribs 16 upwardly extend on the interior surface of the boss 12 such that the ribs 16 project into the channel 13. The ribs taper from substantially the base of the boss 12 towards the top thereof. These ribs 16 are substantially triangular in cross section. Preferably an equal number of ribs 16 are provided on each of the sections of the boss wall between the slots 14. It is important that a sufficient number of ribs 16 are provided to securely grip the pole which is to be held in the channel 13. In the drawings, three ribs 16 are provided between each pair of slots 14.

Many shapes of rib are possible. For example, in an alternative embodiment of the invention a lower portion of the ribs 16 is substantially parallel to the wall of the boss 12. The upper portion of the rib 16 is tapered as before. This may aid to prevent relative movement between the attachment device 10 and the pole.

In a further alternative embodiment of the invention the rib 16 may extend from part way up the channel 13 towards the top of the channel 13. This rib 16 may be substantially uniformly double tapered or it may comprise a lower portion which is substantially parallel to the wall of the boss 12 and an upper double tapered portion.

A body such as a mop head may be attached to the collar 11. This may be achieved, for example, by passing the elongate body of a metal staple over the gathered end of the mop head and subsequently passing the arms of the staple through the corresponding holes 17, 18 provided in the collar 11. The arms of the staples are then deformed towards the boss 12 until the arms of the staple are bordered by projections 19, 20; 21, 22.

In use a pole such as a wooden pole is inserted into the channel 13. The diameter of the pole may be equal or larger than the diameter of the channel 13, but is within the range of size of pole diameter that can be accommodated by the boss 12. As the pole enters the channel 13, the pole forces the wall sections of the boss 12 which are intermediate the slots 14 to move radially outwardly. This causes the width of the slots 14 to increase. However the bridging ribs 15, which are resiliently deformed as a result of the expansion of slot width, act to prevent this expansion of slot width. The bridging ribs therefore cause the wall sections of the boss 12 to grip the pole. The ribs 16 engage the pole and substantially prevent relative movement between the pole and the boss 12. As the bridging ribs 15 act to cause the channel 13 to decrease in diameter, the ribs 16 may cause deformation of the pole at the point of contact therebetween. This aids the securing of the pole to the boss 12.

Alternatively, the pole may be manufactured from plastics material and may comprise a tapered threaded region provided at one end thereof. In practice, the pole is connected to the boss by rotating the threaded taper into the channel defined by the boss.

It can be seen that the device will accommodate a range of pole sizes. The channel 13 will preferably be of sufficient diameter to securely accommodate poles with diameter from substantially 2.26 cm (⅞") to 2.67 cm (1.1/16") or from 1.8 cm to 2.15 cm.

As the bridging ribs 15 are concentrically located, substantial uniform expansion of the channel 13 is achieved.

Figure 4:
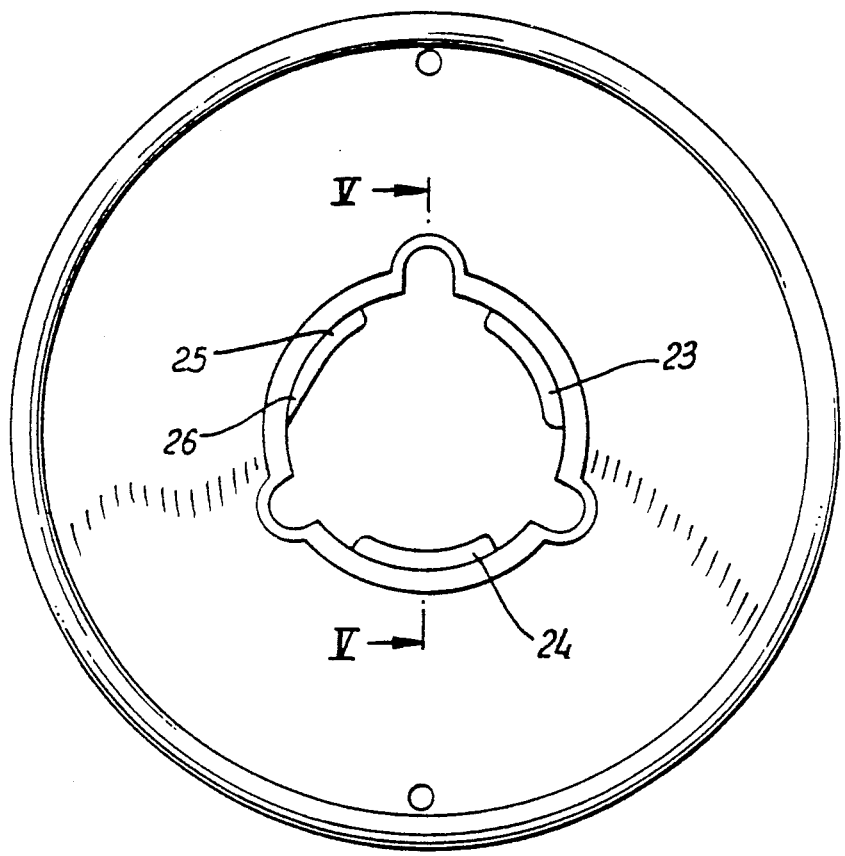
FIG. 4 is a plan view of an alternative embodiment of the invention.
Figure 5:
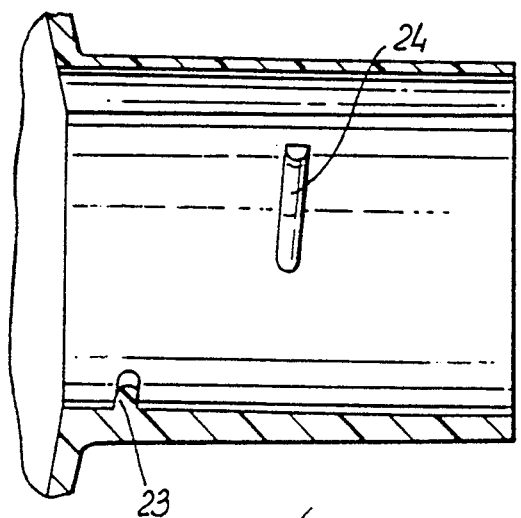
FIG. 5 is a cross section through the line V—V, of FIG. 4.

Referring now to FIGS. 4 and 5, a second embodiment of the invention is shown. The arrangement of collar 11, boss 12 and bridging ribs 15 is similar to that previously described. However, the means for securing the pole to the boss 12 differs from the description of the first embodiments.

Transverse ribs 23, 24, 25 project from the boss 12 into the channel 13. The transverse ribs 23, 24, 25 are spaced at intervals both in plan view and vertical section.

Referring to FIG. 4, the transverse ribs 23, 24, 25 are preferably spaced concentrically around the interior of the boss 12. The upper rib 25 is tapered at one end 26 thereof. Similar tapers may be provided on the corresponding ends of transverse ribs 23, 24.

Referring to FIG. 5 the transverse ribs 23, 24, 25 can be seen to be substantially equidistantly spaced upwardly in the channel 13. The transverse ribs thus form an interrupted screw thread. In one further alternative embodiment a substantially continuous screw thread may be provided on the interior of the boss 12, the screw thread being interrupted by the slots 14.

In use, the pole (not shown) is rotated into the channel such that the tapered end 26 screws onto the pole. This rotation is continued until the end of the pole substantially reaches the base of the channel 13.

As with the first embodiment, if the diameter of the pole is larger than the diameter of the channel 13, but the extent of the excess diameter is not so great as to exceed the limitation of expansion provided by the bridging ribs 15, then the channel 13 will accommodate the pole. As the pole is rotated into the channel 13, the channel 13 expands due to the expansion of the slots 14. The bridging ribs act to supply tension on the pole and thereby help to maintain the relative position of the device 10 and the pole.

Figure 6:
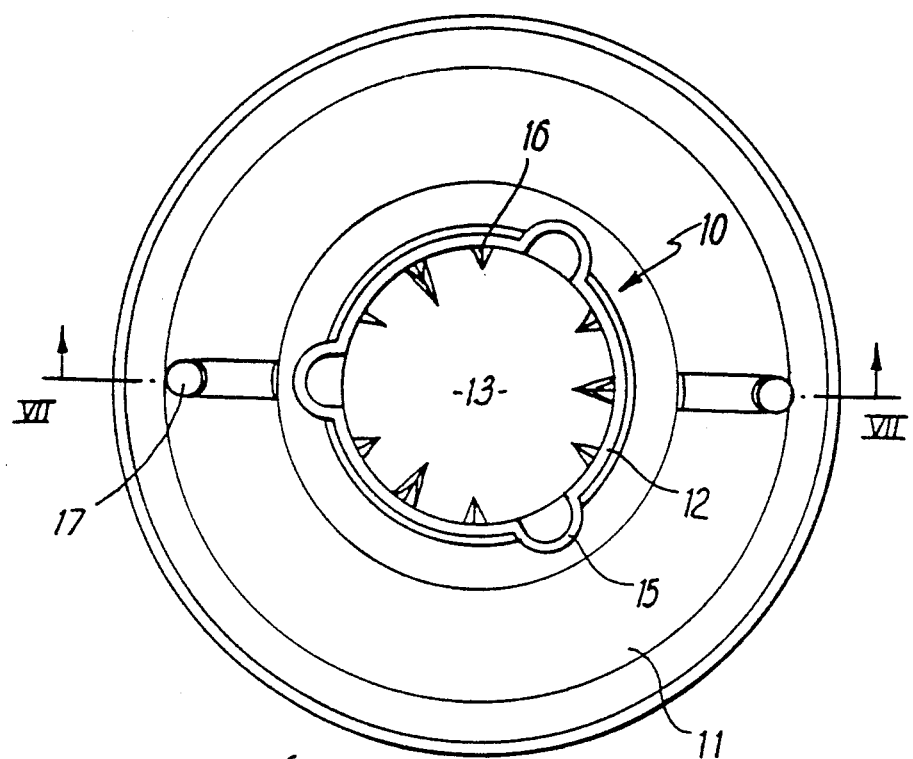
FIG. 6 is a plan view of a further alternative embodiment of the invention.
Figure 7:
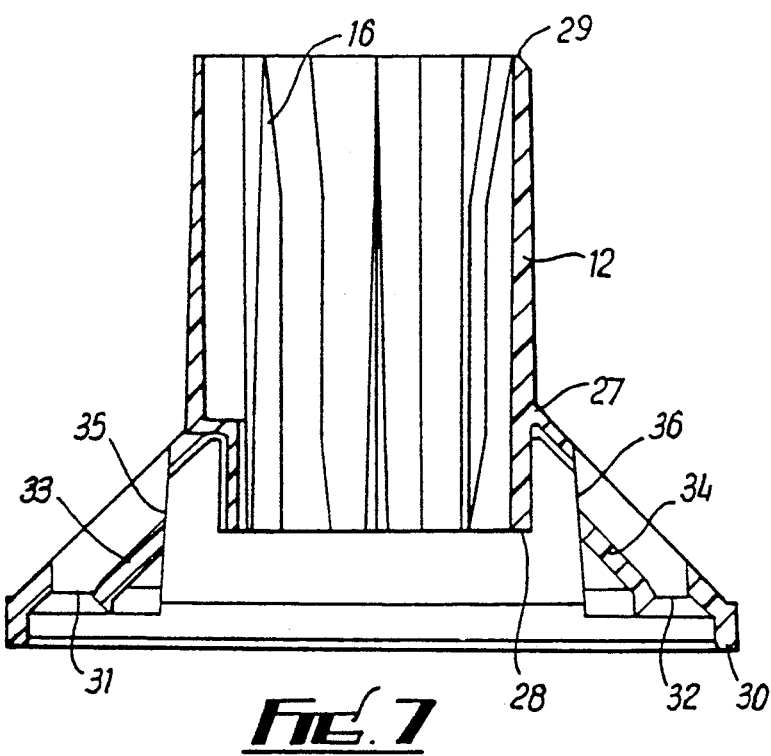
FIG. 7 is a cross section through the line VII—VII of FIG. 6.
Figure 8:
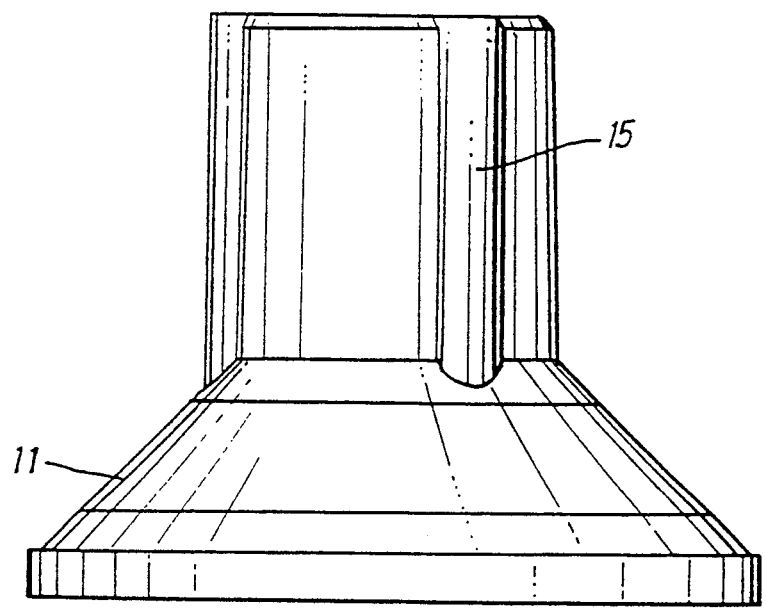
FIG. 8 is a side elevation of FIG. 6.

Referring now to FIGS. 6 to 8, there is shown a further alternative embodiment of the invention.

The collar 11 is attached to the boss 12 at circumference 27 intermediate the two ends 28, 29 of the boss 12. The collar 11 is frusto conical and extends from circumferential region 27 to the base 30 of the collar 11. The diameter of the base 30 of the collar 11 is larger than the diameter of the boss 12.

The mop head may be attached to the collar by stapling. The staple (not shown) is made, for example, from a metal rod formed substantially into a U-shape. One free end portion of the staple is passed through aperture 31 over the collar section 33 through the second aperture 35 and is then bent substantially parallel to the collar section 33 such that it is substantially in contact with the inner side of collar section 33. The other free end portion of the staple is similarly connected to the collar via apertures 32, 36 and collar section 34. This method of stapling provides an enhanced appearance.

It is noted that the embodiments of the invention described do not require the use of tools to provide the means for enabling the channel to expand.

It is to be understood that the scope of the invention should not be limited to the above described embodiments thereof as those embodiments are for illustration only and many modifications can be made.

We claim:

1. An attachment device for poles comprising a collar, means for attaching a body to a first side of the collar, a boss defining an open top channel, at least part of the boss projecting from the side of the collar which is remote from the first side of the collar, means for securing at least part of a pole to an interior portion of the boss and wherein means are provided for enabling the channel open top to expand such that the boss is adapted to accommodate poles of different diameters, wherein said means for enabling includes a plurality of slots at intervals in the boss and wherein each of said slots is bridged by a bridging rib.

2. An attachment device as claimed in claim 1, wherein the width of at least one bridging rib is less than the width of the wall of the boss.

3. An attachment device as claimed in claim 1, wherein said slots are concentrically spaced.

4. An attachment device for poles comprising a collar, means for attaching a body to a first side of the collar, a boss defining an open top channel, at least part of the boss projecting from the side of the collar which is remote from the first side of the collar, means for securing at least part of a pole to an interior portion of the boss and wherein means are provided for enabling the channel open top to expand such that the boss is adapted to accommodate poles of different diameters, wherein the means for securing the pole to the boss comprises a rib located on the inner surface of the boss such that said rib projects into the channel defined by the boss, and wherein said rib extend substantially transversely within the channel.

5. An attachment device as claimed in claim 4, wherein a plurality of transversely extending ribs are provided, the ribs being substantially concentrically spaced when viewed in plan view and/or vertically spaced.

6. An attachment device for poles comprising a collar, means for attaching a body to a first side of the collar, a boss defining a substantially circular open top channel, at least a part of the boss projecting from the side of the collar which is remote from the first side of the collar, a plurality of ribs extending from the interior of the boss into the channel for securing at least a part of the pole to the boss, wherein a plurality of vertically extending slots are provided at intervals in the boss extending outwardly from said channel, each of the slots being bridged by a bridging rib, the transverse ends of the bridging rib being integral with the boss and extending to said channel open top such that the boss is expandable at said channel open top to accommodate poles of differing diameters.

7. The attachment device according to claim 1, wherein said channel is substantially circular and the means for enabling the channel to expand is integral with the boss.

8. An attachment device for poles comprising:
a collar, means for attaching a body to a first side of the collar;
a circumferentially closed boss defining a channel with an open end for receiving a pole, at least part of the boss projecting from the side of the collar which is remote from the first side of the collar;
means for securing at least part of a pole to an interior portion of the boss and wherein means of a one-piece construction are provided for enabling the open end of the channel to expand such that the boss is adapted to accommodate poles of different diameters.

* * * * *